(12) United States Patent
Cohen et al.

(10) Patent No.: US 12,694,132 B1
(45) Date of Patent: Jul. 28, 2026

(54) SYSTEM AND METHOD FOR TECHNOLOGY RISK RANKING

(71) Applicant: Wiz, Inc., New York, NY (US)

(72) Inventors: Amitai Cohen, Kfar Saba (IL); Danielle Aminov, Tel Aviv (IL); Yaara Shriki, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/436,376

(22) Filed: Dec. 30, 2025

(51) Int. Cl.
　　*G06F 21/57*　　　(2013.01)
(52) U.S. Cl.
　　CPC ...... *G06F 21/577* (2013.01); *G06F 2221/034* (2013.01)
(58) Field of Classification Search
　　None
　　See application file for complete search history.

(56) References Cited

U.S. PATENT DOCUMENTS

| | | | | |
|---|---|---|---|---|
| 8,819,442 B1 * | 8/2014 | Gehrig | ................ | H04L 63/1433 713/180 |
| 10,270,798 B2 * | 4/2019 | Zaffarano | .............. | H04L 63/20 |
| 10,628,840 B2 * | 4/2020 | Conti | ................. | G06Q 30/0204 |
| 12,407,702 B1 | 9/2025 | de Wet et al. | | |
| 2017/0286690 A1 | 10/2017 | Chari et al. | | |
| 2021/0243223 A1 | 8/2021 | Arora et al. | | |
| 2021/0360007 A1 | 11/2021 | Paquin et al. | | |
| 2022/0058272 A1 * | 2/2022 | Belfiore, Jr. | .......... | G06F 21/577 |
| 2025/0141912 A1 | 5/2025 | Hill et al. | | |

\* cited by examiner

*Primary Examiner* — Fatoumata Traore
(74) *Attorney, Agent, or Firm* — M&B IP Analysts, LLC

(57)　　　　　　ABSTRACT

A system and method for evaluating levels of risk utilizing a multi-tenant database to detect technologies is presented collecting a plurality of metadata for each technology in a plurality of technologies from a plurality of computing environments from a plurality of tenants; extracting a plurality of features from the metadata for each technology in the plurality of technologies; assigning a weight to each feature in the plurality of features for each technology in the plurality of technologies; determining a plurality of composite risk scores based on the plurality of weighted features for each technology in the plurality of technologies; and initiating a mitigatory action for at least one technology in the plurality of technologies from the plurality of computing environments from the plurality of tenants based on the composite risk scores.

25 Claims, 3 Drawing Sheets

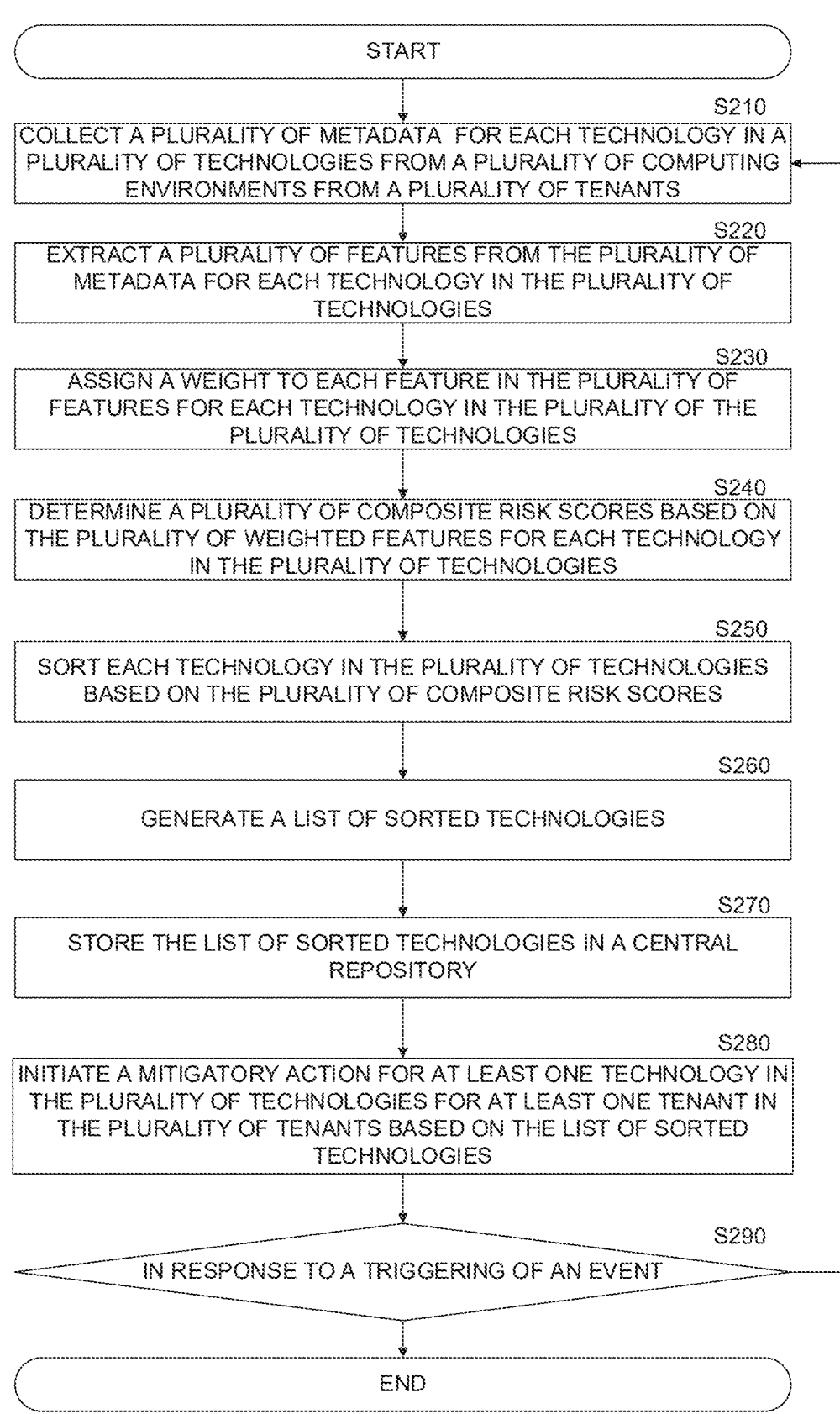

START

S210
COLLECT A PLURALITY OF METADATA FOR EACH TECHNOLOGY IN A PLURALITY OF TECHNOLOGIES FROM A PLURALITY OF COMPUTING ENVIRONMENTS FROM A PLURALITY OF TENANTS

S220
EXTRACT A PLURALITY OF FEATURES FROM THE PLURALITY OF METADATA FOR EACH TECHNOLOGY IN THE PLURALITY OF TECHNOLOGIES

S230
ASSIGN A WEIGHT TO EACH FEATURE IN THE PLURALITY OF FEATURES FOR EACH TECHNOLOGY IN THE PLURALITY OF THE PLURALITY OF TECHNOLOGIES

S240
DETERMINE A PLURALITY OF COMPOSITE RISK SCORES BASED ON THE PLURALITY OF WEIGHTED FEATURES FOR EACH TECHNOLOGY IN THE PLURALITY OF TECHNOLOGIES

S250
SORT EACH TECHNOLOGY IN THE PLURALITY OF TECHNOLOGIES BASED ON THE PLURALITY OF COMPOSITE RISK SCORES

S260
GENERATE A LIST OF SORTED TECHNOLOGIES

S270
STORE THE LIST OF SORTED TECHNOLOGIES IN A CENTRAL REPOSITORY

S280
INITIATE A MITIGATORY ACTION FOR AT LEAST ONE TECHNOLOGY IN THE PLURALITY OF TECHNOLOGIES FOR AT LEAST ONE TENANT IN THE PLURALITY OF TENANTS BASED ON THE LIST OF SORTED TECHNOLOGIES

S290
IN RESPONSE TO A TRIGGERING OF AN EVENT

END

FIGURE 2

SYSTEM AND METHOD FOR TECHNOLOGY RISK RANKING

TECHNICAL FIELD

The present disclosure relates generally to cloud security and threat intelligence, specifically to assessing and ranking the risk of cloud technologies across customer environments.

BACKGROUND

Existing risk assessments rely on localized environment data and do not provide an objective, global measure on how likely a technology is to attract attacks. Organizations lack a systematic way to prioritize security efforts across multiple technologies.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

This invention introduces a global ranking mechanism for cloud technologies based on their risk profile. The system aggregates data across many customers, extracts features from the aggregated data such as prevalence, vulnerability history, incident history, and default privilege levels, assigns weighted values to the extracted features, and outputs a sorted list of ranked technologies, highlighting those that are most likely to be at-risk from malicious third parties. The sorted list can be utilized downstream as the basis for mitigatory actions.

A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by data processing apparatus, cause the apparatus to perform the actions.

In one general aspect, the method may include collecting a plurality of metadata for each technology in a plurality of technologies from a plurality of computing environments from a plurality of tenants; extracting a plurality of features from the metadata for each technology in the plurality of technologies; assigning a weight to each feature in the plurality of features for each technology in the plurality of technologies; determining a plurality of composite risk scores based on the plurality of weighted features for each technology in the plurality of technologies; and initiating a mitigatory action for at least one technology in the plurality of technologies from the plurality of computing environments from the plurality of tenants based on the composite risk scores. Other embodiments of this aspect include corresponding computer systems, apparatus, and computer programs recorded on one or more computer storage devices, each configured to perform the actions of the methods.

Implementations may include one or more of the following features. The method may include: collecting the plurality of metadata of the plurality of technologies from the plurality of computing environments from the plurality of tenants to include, in part, a plurality of incident history reports, where the plurality of incident history reports includes at least one Common Vulnerabilities and Exposures (CVE) report; collecting the plurality of metadata of the plurality of technologies from the plurality of computing environments from the plurality of tenants to include, in part, a plurality of software files that are installed or deployed on a resource from each technology in the plurality of technologies, where the resource is deployed on a cloud computing environment; extracting the plurality of features to include at least one of a prevalence score, a vulnerability score, an incident score or a privilege score; determining a composite risk score based on a weighted sum of the plurality of weighted features for each technology in the plurality of technologies; sorting each technology in the plurality of technologies based on the plurality of composite risk scores; generating a list of sorted technologies; and storing the list of sorted technologies in a central repository; initiating the mitigatory action for at least one technology in the plurality of technologies from the plurality of computing environments from the plurality of tenants based on the list of sorted technologies; initiating the mitigatory action to include at least one of: modifying resource allocation for monitoring the at least one technology in the plurality of technologies, modifying privileges associated with the at least one technology in the plurality of technologies or requiring additional factors of authentication for the at least one technology in the plurality of technologies; triggering an event, and in response to a triggering of the event: refining an at least one scope of an at least one metadata in the plurality of metadata of the plurality of technologies from the plurality of computing environments from the plurality of tenants; collecting a plurality of refined metadata of the plurality of technologies from the plurality of computing environments from the plurality of tenants; extracting a plurality of refined features based on the plurality of refined metadata; assigning a refined weight to each refined feature in the plurality of refined features; determining a plurality of refined composite risk scores based on the plurality of weighted refined features for each technology in the plurality of technologies; sorting each technology in the plurality of technologies based on the plurality of refined composite risk scores; generating a refined list of sorted technologies; and storing the refined list of sorted technologies in the central repository.

The method where the event is based on a response to a detection of one or more technologies not in the plurality of technologies, one or more computing environments for one or more tenants different from the plurality of computing environments, or one or more tenants different from the plurality of tenants.

The method where the event is based on a trend analysis of the stored lists of sorted technologies. The method may include: refining the scope of at least one metadata in the plurality of metadata to include at least one of adding a new technology to the plurality of technologies, adding a new computing environment to the plurality of computing environments or adding a new tenant to the plurality of tenants;

refining the scope of at least one metadata in the plurality of metadata to include at least one of adjusting resource allocation to collect the at least one metadata in the plurality of metadata or adjusting a scale of at least one metadata in the plurality of metadata or adjusting a precision of at least one metadata in the plurality of metadata. Implementations of the described techniques may include hardware, a method or process, or a computer tangible medium.

In one general aspect, non-transitory computer-readable medium may include one or more instructions that, when executed by one or more processing circuitries of a device, cause the device to: collect a plurality of metadata for each technology in a plurality of technologies from a plurality of computing environments from a plurality of tenants; extract a plurality of features from the metadata for each technology in the plurality of technologies; assign a weight to each feature in the plurality of features for each technology in the plurality of technologies; determine a plurality of composite risk scores based on the plurality of weighted features for each technology in the plurality of technologies; and initiate a mitigatory action for at least one technology in the plurality of technologies from the plurality of computing environments from the plurality of tenants based on the composite risk scores. Other embodiments of this aspect include corresponding computer systems, apparatus, and computer programs recorded on one or more computer storage devices, each configured to perform the actions of the methods.

In one general aspect, the system may include a processing circuitry. The system may also include a memory, the memory containing instructions that, when executed by the processing circuitry, configure the system to: collect a plurality of metadata for each technology in a plurality of technologies from a plurality of computing environments from a plurality of tenants; extract a plurality of features from the metadata for each technology in the plurality of technologies; assign a weight to each feature in the plurality of features for each technology in the plurality of technologies; determine a plurality of composite risk scores based on the plurality of weighted features for each technology in the plurality of technologies; initiate a mitigatory action for at least one technology in the plurality of technologies from the plurality of computing environments from the plurality of tenants based on the composite risk scores. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: collect the plurality of metadata of the plurality of technologies from the plurality of computing environments from the plurality of tenants to include, in part, a plurality of incident history reports, where the plurality of incident history reports includes at least one Common Vulnerabilities and Exposures (CVE) report.

The system where the memory contains further instructions which when executed by the processing circuitry further configure the system to: collect the plurality of metadata of the plurality of technologies from the plurality of computing environments from the plurality of tenants to include, in part, a plurality of software files that are installed or deployed on a resource from each technology in the plurality of technologies, where the resource is deployed on a cloud computing environment.

The system where the memory contains further instructions which, when executed by the processing circuitry, further configure the system to: extract the plurality of features to include at least one of a prevalence score, a vulnerability score, an incident score, or a privilege score.

The system where the memory contains further instructions which, when executed by the processing circuitry, further configure the system to: determine a composite risk score based on a weighted sum of the plurality of weighted features for each technology in the plurality of technologies.

The system where the memory contains further instructions which, when executed by the processing circuitry, further configure the system to: sort each technology in the plurality of technologies based on the plurality of composite risk scores; generate a list of sorted technologies; and store the list of sorted technologies in a central repository.

The system where the memory contains further instructions which, when executed by the processing circuitry, further configure the system to: initiate the mitigatory action for at least one technology in the plurality of technologies from the plurality of computing environments from the plurality of tenants based on the list of sorted technologies.

The system where the memory contains further instructions which, when executed by the processing circuitry, further configure the system to: initiate the mitigatory action to include at least one of: modify resource allocation for monitoring the at least one technology in the plurality of technologies, modifying privileges associated with the at least one technology in the plurality of technologies or requiring additional factors of authentication for the at least one technology in the plurality of technologies.

The system where the memory contains further instructions which, when executed by the processing circuitry, further configure the system to: trigger an event, and in response to a triggering of an event: refine an at least one scope of an at least one metadata in the plurality of metadata of the plurality of technologies from the plurality of computing environments from the plurality of tenants; collect a plurality of refined metadata of the plurality of technologies from the plurality of computing environments from the plurality of tenants; extract a plurality of refined features based on the plurality of refined metadata; assign a refined weight to each refined feature in the plurality of refined features; determine a plurality of refined composite risk scores based on the plurality of weighted refined features for each technology in the plurality of technologies; sort each technology in the plurality of technologies based on the plurality of refined composite risk scores; generate a refined list of sorted technologies; and store the refined list of sorted technologies in the central repository.

The system where the event is based on a response to a detection of one or more technologies not in the plurality of technologies, one or more computing environments for one or more tenants different from the plurality of computing environments, or one or more tenants different from the plurality of tenants.

The system where the event is based on a trend analysis of the stored lists of sorted technologies.

The system where the memory contains further instructions which when executed by the processing circuitry further configure the system to: refine the scope of at least one metadata in the plurality of metadata to include at least one of adding a new technology to the plurality of technologies, adding a new computing environment to the plurality of computing environments or adding a new tenant to the plurality of tenants.

The system where the memory contains further instructions which when executed by the processing circuitry further configure the system to: refine the scope of at least one metadata in the plurality of metadata to include at least one of adjusting resource allocation to collect the at least one metadata in the plurality of metadata or adjusting a scale of at least one metadata in the plurality of metadata or adjusting a precision of at least one metadata in the plurality of metadata. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 is an example flowchart of a method for utilizing a risk database for detections across tenants, implemented in accordance with an embodiment.

DETAILED DESCRIPTION

Figure 1:
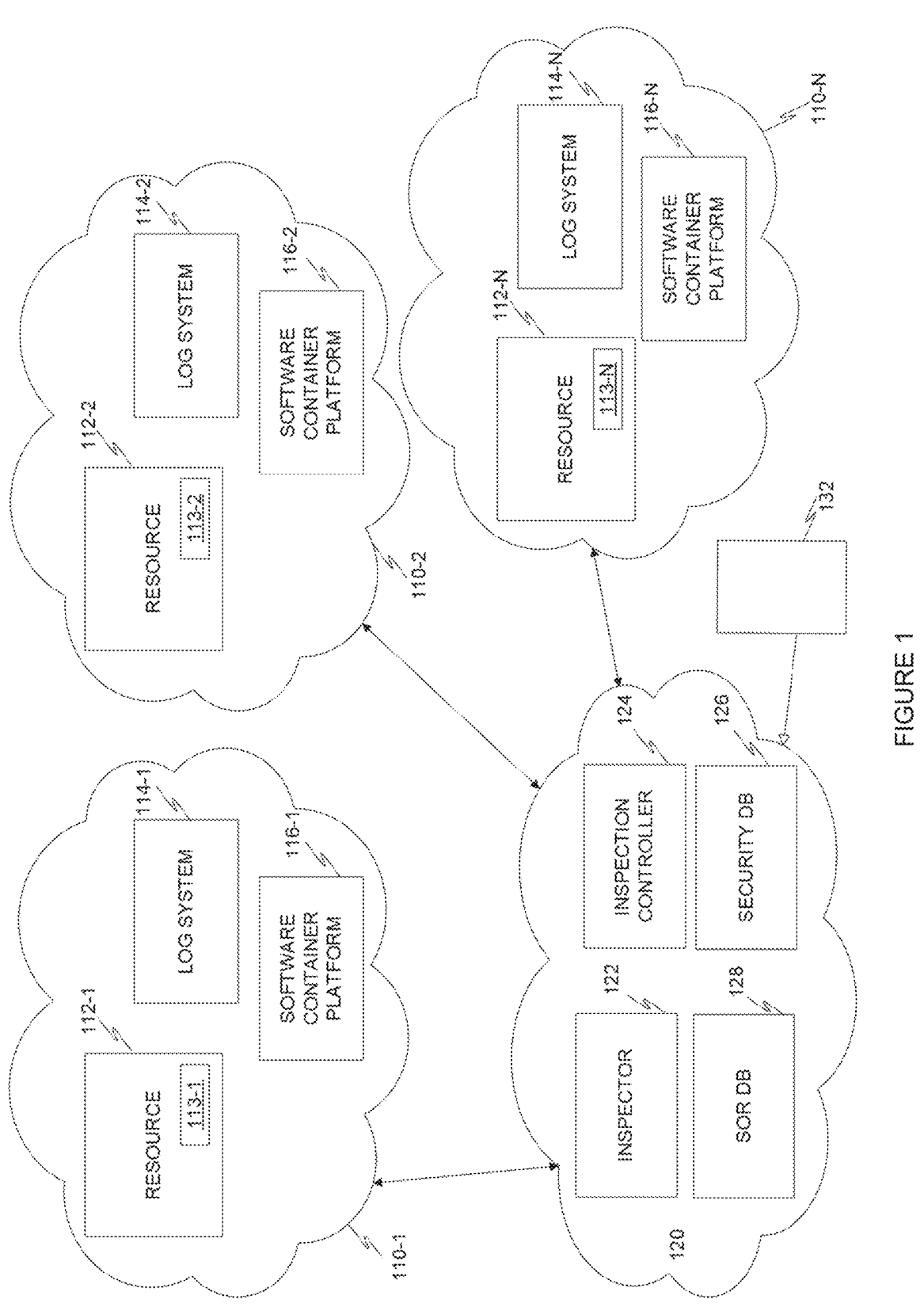
FIG. 1 is an example schematic diagram of a multi-tenant cloud computing environment utilizing a central risk database for evaluating risk of certain technologies within the multi-tenant cloud computing environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Various embodiments include collecting metadata associated with cloud technologies.

Certain aspects include, according to an embodiment, the construction of efficient data pipelines for maintaining a database of technologies ranked by their severity of risk, mechanisms for utilizing the database to evaluate the severity of risk of technologies, performing mitigatory actions, and mechanisms for re-evaluating the data and re-ranking technologies by their severity of risk.

FIG. 1 is an example schematic diagram of a multi-tenant cloud computing environment utilizing a central risk database for evaluating risk of certain technologies within the multi-tenant cloud computing environment, implemented in accordance with an embodiment.

In an embodiment, an inspection environment 120 is configured to inspect a plurality of computing environments 110-1 through 110-N, referred to individually as first computing environment 110-1, second computing environment 110-2, and so on, and collectively as computing environments 110-N, where 'N' is an integer having a value of '2' or greater. In some embodiments, computing environments are also referred to as tenant environments. For example, a multi-tenant environment is a computing architecture where a single software or infrastructure instance serves multiple customers (tenants), each with isolated data and configurations. Tenants share underlying resources, such as compute, storage, and networking, while maintaining logical separation. Examples include SaaS platforms such as Salesforce®, where different organizations access the same application stack, and cloud service providers such as Amazon® Web Services (AWS) offering shared services such as S3 buckets or EC2 hosts to multiple clients. Multi-tenancy enhances resource efficiency and scalability.

In an embodiment, a computing environment such as the first computing environment 110-1, the second computing environment 110-2, and the n-th computing environment 110-N, is implemented on a network computing environment, a cloud computing environment, a hybrid computing environment, a combination thereof, and the like. In certain embodiments, a cloud computing environment includes a virtual private cloud, a virtual network, a virtual private network, a combination thereof, and the like.

In this example illustration, the second computing environment 110-2 is an environment which is isolated from the first computing environment 110-1, for example, as two different tenants of a single cloud service provider (CSP), as two tenants of two CSPs, etc. In some embodiments, the second computing environment 110-2 and the first computing environment 110-1 share certain applications, deployed technologies, third-party services, and the like.

In an embodiment, a resource, such as resource 112-1, 112-2, and 112-N, are each configured to expose physical resources, virtual resources, and the like. A resource may be, for example, a virtual machine, a software container, a serverless function, a combination thereof, and the like. In some embodiments, a principal is an entity which is authorized to initiate actions in the first computing environment 110-1, such as a user account, a service account, a role, a combination thereof, and the like.

In some embodiments, a sensor, such as sensor 113-1, 113-2, and 113-N are each a software application deployed on a resource, such as resource 112-1, 112-2, and 112-N (respectively). In an embodiment, the sensor executes in a kernel space environment of the resource. In certain embodiments, the sensor is configured to detect runtime events. In an embodiment, the sensor is further configured to send a detection based on a runtime event to an inspection environment 120. In some embodiments, the sensor is configured to generate aggregate runtime data and send the aggregated runtime data to the inspection environment 120. In some embodiments, this process is repeated for each computing environment in the plurality of computing environments.

According to an embodiment, each computing environment in the plurality of computing environments includes a log system, such as log system 114-1, 114-2, and 114-N. In an embodiment, the log system is in a separate cloud computing environment, and each is a centralized service for collecting, storing, and analyzing log data generated by cloud-based infrastructure, resources, applications, services, various combinations thereof, and the like. In some embodiments, the log system is configured to ingest in real-time, near real-time, etc., logs from distributed sources. In an embodiment, logs in the log system include system events, application errors, audit trails, user activity, various combinations thereof, and the like. In some embodiments, the log system, such as log system 114-1, is, for example, AWS CloudWatch, GCP Cloud Logging, and the like.

In certain embodiments, each computing environment in the plurality of computing environments includes a software container platform, such as software container platform 116-1, 116-2, and 116-N. In an embodiment, the software container platform is an abstraction layer that is configured to package applications and their dependencies into isolated, lightweight runtime environments (containers) for their respective computing environment. In an embodiment, a software container shares the host OS kernel but remains decoupled from the underlying infrastructure, ensuring portability across environments.

In an embodiment, a software container platform 116-1 is configured to manage the lifecycle of software containers, utilizing tools for orchestration, networking, scaling, and security. Examples include Docker®, which provides container runtime and image management, and Kubernetes®, which orchestrates container deployment, scaling, and service discovery across clusters.

A software container platform 116-1 is implemented, in an embodiment, utilizing OpenShift® and Amazon® ECS, which may be configured to extend Kubernetes, offer proprietary orchestration, including CI/CD integration and policy enforcement, and the like.

According to an embodiment, a software container platform 116-1 includes a plurality of container images (or otherwise has access to a repository of container images), from which a software container (i.e., a live container) is deployed.

In an embodiment, an inspection environment 120 includes an inspector 122, an inspection controller 124, a security database 126, and an SOR (severity-of-risk) database 128. In an embodiment, the inspector 122 is configured to detect a plurality of metadata for each technology in a plurality of technologies. According to an embodiment, metadata indicates a cybersecurity threat. For example, the metadata may be information representative of a file, a folder, a signature, a cryptographic key, a certificate, a code object, various combinations thereof, and the like.

In certain embodiments, an inspection controller 124 is configured to allocate inspector workloads, such as the inspector 122, for the purpose of inspecting each computing environment of the plurality of computing environments. In some embodiments, the inspection controller 124 is configured to allocate inspector workloads for a subset of the plurality of computing environments. In an embodiment, the inspection controller 124 is configured to initiate asset discovery to detect resources, such as resource 112, and determine a frequency of inspection thereof.

In an embodiment, the inspection controller 124 is configured to orchestrate a plurality of inspector workloads. In certain embodiments, the inspection controller 124 is further configured to ingest logs from the log system 114-1, 114-2, 114-N, and the like. In an embodiment, the inspection controller 124, the inspector 122, and the like are configured to store detections, enrichments, findings, forensic artifacts, and the like in a security database 126.

In some embodiments, the security database 126 is configured to store representations of computing environments. In an embodiment, the security database 126 is configured to store a per-tenant representation, such that a representation of the second computing environment 110-2 is isolated from a representation of the first computing environment 110-1.

In an embodiment, the security database 126 is configured to store a representation of a computing environment based on a unified data schema. In some embodiments, a unified data schema allows storing representations of resources implemented in different environments using a single (i.e., unified schema). Thus, a virtual machine in GCP or in AWS would be represented using the same schema (i.e., data structure).

According to an embodiment, the inspection environment 120 includes a severity-of-risk (SOR) database 128. In an embodiment, the SOR database 128 is utilized based on detections, findings, etc., from a plurality of metadata for each technology in a plurality of technologies for each environment in the plurality of computing environments for each tenant in the plurality of tenants. For example, in some embodiments, the SOR database 128 is populated based on data extracted from a plurality of computing environments from a plurality of tenants, such as from the first computing environment 110-1, the second computing environment 110-2, and the n-th computing environment 110-N, or any combination thereof. In some embodiments, the SOR database is a multi-tenant database.

In some embodiments, ownership of the first computing environment 110-1 and second computing environment 110-2 is owned by the same tenant in the plurality of tenants, while a third computing environment (not shown) is owned by a second, different tenant in the plurality of tenants. In some embodiments, the first computing environment 110-1 is owned by a first tenant in the plurality of tenants, the second computing environment 110-2 is owned by a second tenant in the plurality of tenants, and the n-th computing environment is owned by the n-th tenant in the plurality of tenants, or any combination thereof.

In an embodiment, the plurality of technologies is defined as a technology stack on a resource deployed in a cloud computing environment. In an embodiment, the technology stack (or "tech stack") includes a collection of software files, such as an application, an operating system, a driver, a file system, and the like, which are installed or deployed on a resource, such as a virtual machine, which in turn is deployed in a cloud computing environment. For example, Nginx® deployed on a virtual machine having a Linux® operating system has a technology stack (also referred to as a tech stack) which includes Nginx and Linux.

In an embodiment, the plurality of technologies includes physical hardware, components of hardware, including constituent components of the hardware, software, processes associated with the software, communication relays, and any combination thereof.

In an embodiment, a subset of the plurality of technologies is designated as targeted technologies for risk evaluation. The targeted technologies may be selected based on one or more criteria, such as presence in incident history reports, elevated privilege characteristics, anomalous prevalence across tenants, or administrator-defined scope. In some such embodiments, a graphical user interface, dashboard, a combination thereof, and the like, is configured to accept user input in selecting, determining, specifying, a combination thereof and the like, the subset of the plurality of technologies.

In an embodiment, the plurality of metadata associated with each technology in the plurality of technologies is collected, in part, with data in incident reports 132. In some embodiments, the SOR database 128 is configured to receive incident reports 132 through a user interface, including a graphical user interface input, from a human user such as a system administrator. In some embodiments, the SOR database 128 is configured to receive incident reports 132 via a secure internet connection. In some embodiments, the incident reports 132 is from a third-party. In some embodiments, the incident reports 132 are a type of Common Vulnerabilities and Exposures (CVE) report. In some embodiments, the incident reports 132 are in a .json file format.

In some embodiments, the SOR database 128 is configured to detect metadata associated with one or more technologies in the plurality of technologies in the received incident reports 132. In some embodiments, the SOR database 128 is configured to apply optical character recognition on the received incident reports 132. In some embodiments, the SOR database 128 is configured to utilize natural language parsing techniques, such as named-entity recognition (NER), to identify one or more technologies and one or more metadata, such as tech stacks, software versions or security findings, within the received incident reports 132. Furthermore, the SOR database 128 employs one or more neural networks to analyze the contextual relationship between identified technologies and identified metadata with the plurality of technologies and plurality of metadata to associate identified technology and identified metadata with at least one technology in the plurality of technologies or at least one metadata in the plurality of metadata, or any combination thereof. In some embodiments, the SOR database 128 is configured to update at least one metadata in the plurality of metadata based on the associated metadata.

In some embodiments, metadata in the plurality of metadata for each technology in the plurality of technologies includes subscription identifiers used for billing and resource grouping, names of security groups and their attached ingress and egress policies, etc.

In an embodiment, metadata in the plurality of metadata for each technology in the plurality of technologies is represented as binary value. For example, the presence of a certain technology is represented as a binary occurrence per customer, e.g., "0" as the absence of a certain technology per customer or "1" for the detection of a certain technology per customer. In another example, whether a certain technology has administrative privileges or kernel-level access is represented as a binary occurrence per customer, e.g., "0" as the technology lacks administrative access per customer or "1" as the technology having administrative access per customer.

In an embodiment, metadata in the plurality of metadata for each technology in the plurality of technologies is represented as an integer. For example, the number of child threads created by a certain technology in the plurality of technologies is expressed as an integer. In another example, the maximum number of child threads created by a certain technology in the plurality of technologies is expressed as an integer.

In an embodiment, metadata in the plurality of metadata for each technology is expressed as a ratio. For example, the number of tenants that require multi-factor authentication for a certain technology in the plurality of technologies is expressed as a ratio, e.g., number of tenants that require multi-factor authentication over the total number of tenants that have that technology. The scale or the precision of one or more metadata in the plurality of metadata may be predetermined by the SOR database 128 or an end user, e.g., a value of 0.9888888 may be stored as 0.989.

In an embodiment, the SOR database 128 is configured to determine the precision for each metadata in the plurality of metadata. In some embodiments, the precision for one or more metadata in the plurality of metadata is determined by an end user. In some embodiments, the precision for one or more metadata in the plurality of metadata is determined by the SOR database 128 based on resource management techniques. In some embodiments, the precision for one or more metadata in the plurality of metadata is determined based on one or more historical sorted lists.

In an embodiment, metadata in the plurality of metadata includes known vulnerabilities or exposures associated with one or more technologies in the plurality of technologies. In some embodiments, known vulnerabilities or exposures are obtained from third-party reports. In some embodiments, known vulnerabilities or exposures are obtained from internal reports. In some embodiments, known vulnerabilities or exposures are obtained from CVEs.

In an embodiment, metadata in the plurality of metadata for each technology in the plurality of technologies includes incident history. In some embodiments, the incident history details a specific cybersecurity incident, such as a breach or exploitation, regarding the certain technology. In some embodiments, incident history is obtained from third-party reports.

In an embodiment, the SOR database 128 is configured to determine prevalence of certain technologies, in various computing environments. For example, in an embodiment, the SOR database 128 is configured to analyze a diverse range of metadata. In some embodiments, the prevalence or rarity of a specific technology across multiple incident history reports indicates a level of risk. In some embodiments, a widely-used technology is determined to be benign, while a rare or unique technology may trigger further inspection.

In certain embodiments, additional metadata in the plurality of metadata for each technology in the plurality of technologies is stored in the SOR database 128 including IP addresses, domain names, file hashes, various combinations thereof, and the like. In some embodiments, these elements are correlated with telemetry (e.g., runtime data from each sensor (sensor 113-1, 113-2, 113-N) in the plurality of sensors, and the logs ingested from each log system in the plurality of log systems (log system 114-1, 114-2, 114-N), a combination thereof, and the like), across tenants, to determine distribution patterns.

In some embodiments, the SOR database 128 is configured to evaluate metadata in the plurality of metadata for each technology in the plurality of technologies such as Amazon Machine Images (AMIs), service account identifiers, subscription IDs, and the like. For example, a subscription ID seen in multiple, unrelated environments signals shared infrastructure abuse, according to an embodiment. Additionally, in certain embodiments, artifacts such as security group names and Azure application identifiers allow generating an insight based on the configuration and behavior (e.g., activity patterns) of workloads in the cloud. In some embodiments, a rules engine is used, in part, to evaluate metadata in the plurality of metadata for each technology in the plurality of technologies.

FIG. 2 is an example flowchart of a method for utilizing a risk database for detections across tenants, implemented in accordance with an embodiment. While cloud computing environments are discussed in this example, it is readily apparent that other computing environments, such as on-prem environments, networked computing environments, hybrid computing environments, and various combinations thereof, can be utilized in the methods disclosed herein without departing from the scope of this disclosure.

At S210, a plurality of technologies are detected. In an embodiment, the plurality of technologies are detected in a first computing environment in a plurality of computing environments. In an embodiment, detecting a plurality of technologies in a plurality of computing environments includes collecting metadata from various components (e.g., resources) deployed within each computing environment in the plurality of computing environments.

In some embodiments, detecting the plurality of technologies includes identifying one or more targeted technologies within the computing environment. The targeted technologies may include newly observed technologies, technologies associated with incident history reports, or technologies satisfying one or more risk-selection rules (e.g., privilege level, vulnerability indicators, or cross-tenant rarity). In some embodiments, targeted technologies are based on user input obtained from a graphical user interface, dashboard, a combination thereof and the like.

In some embodiments, detection includes utilizing collectors, agents, sensors, inspectors, inspection controllers, and the like. In certain embodiments, these are integrated into the cloud infrastructure to monitor system activity, API interactions, resource metadata, and the like, in real time, via scheduled inspections, a combination thereof, and the like. In some embodiments, cloud logs are further ingested and utilized in detecting metadata.

For example, a runtime sensor is configured to identify a plurality of metadata associated with a plurality of technologies deployed in a Kubernetes cluster running on a LAMP stack within the first computing environment. In an embodiment, an inspector is configured to extract configuration details, such as the name and access policies of a security group associated with an EC2 instance in AWS. In some embodiments, detection of metadata includes detecting service accounts utilized by applications to interact with cloud services, along with their associated permissions and usage patterns. In some embodiments, LAMP is a technology in the plurality of technologies, the first computing environment is one or more computing environments in a plurality of tenants and configuration details, cloud objects, usage patterns are metadata in the plurality of metadata.

For example, a plurality of metadata is detected in a second computing environment. In an embodiment, the second computing environment operates independently of the first computing environment. In certain embodiments, the second computing environment includes a similar telemetry collection process. Collecting telemetry data from two distinct environments allows cross-tenant detection and comparative analysis of cloud object usage patterns. In some embodiments, the second computing environment belongs to the same tenant as the first computing environment. In some embodiments, the second computing environment belongs to a second, different tenant than the tenant of the first computing environment, e.g., the tenants in the plurality of tenants are within a multi-tenant cloud infrastructure.

In some embodiments, similar collection mechanisms as in the first computing environment, including runtime sensors, API integrations, data fetchers, inspectors, log ingestors, etc., or a combination thereof, are present and utilized in the second computing environment. In an embodiment, similar collection mechanisms are present and utilized in each computing environment in the plurality of computing environments for each tenant in the plurality of tenants.

In some embodiments, technologies in the plurality of technologies include LAMP (Linux, Apache, MySQL, PHP) and JavaScript-based MEAN (MongoDB, Express, Angular, Node.js) and MERN (MongoDB, Express, React, Node.js) stacks.

At S220, a plurality of features is extracted from the collected metadata. In an embodiment, a plurality of features is extracted for each technology in the plurality of technologies is extracted from the collected metadata. In some embodiments, a normalization technique is applied to the metadata prior to extracting the plurality of features.

In some embodiments, the plurality of extracted features include a prevalence score, a vulnerability score, an incident score, a privilege score, a combination thereof, and the like.

In some embodiments, a prevalence scores is determined for each technology of the plurality of technologies based on the collected metadata. For example, in an embodiment, a prevalence score is calculated for each detected cloud object, one metadata in the plurality of metadata, includes analyzing how frequently that object appears across a computing environment, across multiple computing environments, etc. For example, in an embodiment, a prevalence score is calculated for each customer utilizing the certain technology. According to an embodiment, the prevalence score is a statistical measurement that reflects the relative distribution of the certain technology among different tenants, in the same tenant, in different environment of the same tenant, in different environments of different tenants, etc. For example, different environments of the same tenant includes a production environment and a testing environment.

In some embodiments, determining the prevalence score is based on a histogram. A histogram is a graphical representation that shows the distribution of a dataset by grouping values into ranges, often described as bins, and displaying the frequency, such as the number of data points in each range, as bars. In one example, each metadata in the plurality of metadata is sorted into bins based on their respective numerical value, and the frequency of the metadata for each bin is determined. In some embodiments, a normalization technique is applied to the frequency, such as dividing each frequency by the total number of metadata in the plurality of metadata. In some embodiments, the prevalence score is based on the bin with the highest number of metadata in the plurality of metadata.

In some embodiments, determining the prevalence score includes aggregating identifiers for a certain technology and performing a cross-environment comparison. For example, if a specific technology appears in multiple environments, it is assigned a higher prevalence score than technology that appears in only one computing environment.

In some embodiments, the prevalence score is expressed as a ratio, percentage, etc., such as the number of environments where the certain technology is found divided by the total number of environments monitored. In certain embodiments, these metrics are normalized to account for differing environment sizes, differing activity levels, etc.

In some embodiments, the normalization technique includes determining a vulnerability score based on a metadata. For example, in an embodiment, a vulnerability score is calculated based on the number of CVEs associated with the certain technology, the severity of the CVEs associated with the certain technology, or a combination thereof.

In some embodiments, the normalization technique includes calculating an incident score of the metadata. For example, in an embodiment, the incident score is the number of times the metadata was present in the incident history.

In some embodiments, the normalization technique includes calculating a privilege score of the metadata. For example, in an embodiment, the privilege score represents the likelihood that the certain technology runs with elevated privileges (e.g., admin by default) based on the metadata.

At S230, each feature is assigned a weight value. In an embodiment, each feature in the plurality of features for each technology in the plurality of technologies is assigned a weight value.

In an embodiment, each feature in the plurality of features is assigned a weight. In some embodiments, the weight assigned to the extracted feature is user-specified. In some embodiments, the weight is dynamically adjusted based on historical incident outcomes, based on requirements of a specific customer, a combination thereof, and the like.

At S240, a composite risk score is determined. In an embodiment, a plurality of composite risk scores is determined based on the plurality of weighted features for each technology in the plurality of technologies. In an embodiment, a plurality of composite risk scores are determined for each technology in the plurality of technologies.

In some embodiments, each composite risk score in the plurality of composite risk scores is a weighted sum of the plurality of extracted features of each weighted features for each technology in the plurality of technologies. For example, a composite risk score is determined by equation 1.

$$Z_1 = w_1(\text{Feature}_1) + \ldots + w_n(\text{Feature}_n) \tag{1}$$

Where Z is the first composite risk score in the plurality of composite risk scores, $w_1$ is the first weight assigned to the first extracted feature of the plurality of extracted features, $\text{Feature}_1$ is the first extracted feature of the plurality of extracted features, $w_n$ is the n-th weight assigned to n-th extracted feature of the plurality of extracted features, $\text{Feature}_n$ is the n-th extracted feature of the plurality of extracted features.

At S250, each technology in the plurality of technologies are sorted. In an embodiment, the SOR database 128 is configured to sort each technology in the plurality of technologies based on their respective composite risk score in the plurality of composite risk scores.

At S260, a list of sorted technologies is generated. In an embodiment, the SOR database 128 is configured to generate the list of sorted technologies based on a sorting algorithm. In some embodiments, the list of sorted technologies is a subset of technologies in the plurality of technologies.

In an embodiment, the sorting algorithm is applied to the plurality of composite risk scores to generate a sorted list. In some embodiments, the sorting algorithm ranks each technology by the highest composite risk score to lowest composite risk score to generate the sorted list. In some embodiments, the sorting algorithm ranks technology from lowest risk score to highest risk score to generate the sorted list. In some embodiments, a user specifies a certain number of technologies to be listed on the sorted list, e.g., output a sorted list only listing the top ten technologies with the highest associated composite risk scores. In some embodiments, a user specifies a subset of technologies of the plurality of technologies to be listed on the sorted list, such as by data center or cloud service provider.

At S270, the list of sorted technologies is stored in a central database. In an embodiment, the SOR database 128 is configured to store the sorted list as a historical sorted list in a central repository. In an embodiment, the central repository is the SOR database 128.

In an embodiment, SOR database 128 includes a rules engine to determine a mitigatory action. In an embodiment, the rules engine determines a mitigatory action based on one or more rules, one or more data analyses or a combination thereof, to determine a mitigatory action.

In some embodiments, the one or more rules, the one or more data analyses or a combination thereof evaluates one or more metadata in the plurality of metadata, one or more technologies in the plurality of technologies, one or more features in the plurality of features, one or more composite risk scores in the plurality of composite risk scores, the sorted list of technologies, one or more of historical sorted lists of technologies in the plurality of historical sorted lists of technologies, or a combination thereof, to determine a mitigatory action.

In some embodiments, the one or more rules each include a condition and an action. For example, a rule is implemented as an 'if-then' statement. In an embodiment, the rule is predefined by an end-user. In an embodiment, a rule is a logical expression which further includes an action. For example, a rule states, in an embodiment, "IF technology xyz is a technology included in the sorted list of technologies THEN generate an alert". In another example, "IF metadata abc is absent in the plurality of metadata for one or more technologies in the plurality of technologies THEN rerun metadata collection with additional resource allocation to collect metadata abc."

In some embodiments, the one or more data analyses is a statistic methodology, such as a time-series analysis or regression analysis. As an example, the SOR database 128 performs the data analyses techniques based on a regression analysis using a plurality of historical privilege scores of a technology in the plurality of technologies based on a plurality of historical sorted lists.

In an embodiment, the one or more data analyses determines that an increasing number of tenants are requiring multi-factor authentication for a certain technology based on the plurality of historical sorted lists. In this example, SOR database 128 generates a mitigatory action based on the data analysis to generate an alert to a tenant in the plurality of tenants with the certain technology to require multi-factor authentication.

In an embodiment, a mitigatory action is generated based on the one or more rules, the one or more data trends analyses, or a combination thereof, is above or below predetermined threshold. For example, technologies having a prevalence score below a predefined prevalence threshold generate a mitigatory action that creates an alert, initiate further inspection, a combination thereof, and the like.

As an example, if a certain technology appears in the first computing environment but is listed in the SOR database as having extremely low prevalence (e.g., seen in only one out of many tenants), the risk database is configured to flag the certain technology as a potential risk for the tenant of the first computing environment. As another example, if a certain technology appears in the second computing environment with a high configuration feature (representing the technology has kernel-level access) but is often listed in the SOR database with a low configuration feature (representing the technology often does not have kernel-level access), the SOR database flags the technology as a potential risk for the tenant of the second computing environment.

In an embodiment, if a certain technology is highly prevalent and a certain configuration is highly prevalent, configurations that depart from the highly prevalent configuration are flagged as rare, potentially anomalous, high risk or a combination thereof. For example, if a popular configuration of a certain technology does not grant kernel-level access, then configurations of that certain technology which permit kernel-level access are flagged as rare, potentially anomalous, high risk, a combination thereof and the like.

By leveraging metadata to determine features from multiple computing environments from multiple tenants, the SOR database allows identifying risky technologies that are not detectable through traditional, single-tenant methods.

According to an embodiment, the SOR database 128 serves as a central repository for aggregating cross-tenant cybersecurity intelligence for metadata.

In an embodiment, graphical user interfaces, dashboards, and the like, are provided to end users. The end users include security personnel, security administrators, network administrators, any combination thereof, and the like.

In some embodiments, a mitigatory action includes displaying an indicator of risk on the graphical user interfaces, dashboards, and the like. In an embodiment, an indicator of risk is displayed for one or more certain technologies in the plurality of computing environments. In some embodiments, the indicator of risk is displayed with an associated confidence level. In some embodiments, the confidence level is based on the prevalence score.

At S280, a mitigatory action is initiated. In an embodiment, the mitigatory action is initiated via the graphical user-interfaces or dashboards. In an embodiment, a mitigatory action is initiated based on the detection of the SOR for a certain technology. For example, in an embodiment, where a suspicious technology is flagged, the SOR technology is configured to trigger a response to quarantine the associated workload, revoke its runtime permissions, block further deployment, require additional factors of authentication, adjust privileges, a combination thereof and the like.

In an embodiment, the SOR database 128 is configured to initiate a mitigatory action based on a trend analysis of the list of sorted technologies based. In some embodiments, mitigatory action is warning, mitigation actions, triggering an event to re-run metadata collection with a refined scope, feature analysis and output an updated sorted list. For example, SOR database 128 determines a specific tenant in the plurality of tenants is not utilizing multi-factor authentication for the certain technology and provides a warning, via a graphical user interface or dashboard, require multi-factor authentication for the certain technology for the specific tenant, a combination thereof, and the like.

In some embodiments, the mitigatory action is initiated that adjusts the resource allocation for monitoring one or more technologies in the plurality of technologies. For example, in an embodiment, where a risky technology is flagged, the SOR database is configured to allocate additional bandwidth for security analysis, increase the frequency and depth of monitoring servers responsible for running the one or more technologies in the plurality of technologies, allocate more memory to collect more detailed logs of the certain technology, a combination thereof, and the like.

In some embodiments, the mitigatory action of a proactive hardening of one or more technologies in the plurality of technologies is initiated. For example, in an embodiment, where at least one technology in the plurality of technologies is flagged, the SOR database is configured to disable non-essential services associated with the at least one technology in the plurality of technologies, modifying privileges associated with the at least one technology in the plurality of technologies, requiring additional factors of authentication for the at least one technology in the plurality of technologies, thereby reducing the system's attack surface.

In some embodiments, the mitigatory action includes requiring an end-user to update version or configuration of technology. In some embodiments, the SOR database 128 is configured to update the version or configuration of technology.

In cloud computing environments, a mitigatory action includes disabling anomalous service accounts, removing anomalous security group rules, isolating affected virtual machines, a combination thereof, and the like. In an embodiment, a mitigatory action is executed through an API integration with cloud providers such as AWS, Azure, and the like, allowing for rapid, proactive measures. The goal is to reduce exposure time by responding proactively to technologies deemed suspicious based on aggregated multi-tenant intelligence.

At S290, in response to a triggering of an event, the SOR database 128 is configured to re-run steps S210-S280. In an embodiment, an event is configured to trigger on a periodic, routine, or scheduled basis. In some embodiments, the event is triggered in response to a user request, e.g., via a graphical user interface, platform, or command prompt.

In some embodiments, the event is triggered based on one or more new technologies discovered in one or more computing environments. In some embodiments, the event is triggered based on a new computing environments discovered in the plurality of tenants. In some embodiments, the event is triggered based on the discovery of a new tenant. In some embodiments, the event is configured to trigger in response to receiving a new incident report. In some embodiments, the event is configured to trigger in response one or more technologies in the plurality of technologies included in a new incident report. In some embodiments, the event is configured to trigger in response to the trend analysis of historical sorted lists. In some embodiments, the event is configured to trigger based on a mitigatory action.

In an embodiment, while re-running the steps S210-S280, one or more steps are modified. In some embodiments, while re-running the steps S210-S280, all, a subset or specific tenants in the plurality of tenants will be included in the new metadata collection. In some embodiments, while re-running the steps S210-S280, all, a subset or specific computing environments in the plurality of computing environments, will be included in the new metadata collection. In some embodiments, while re-running the steps S210-S280, all, a subset or specific technologies in the plurality of technologies, will be included in the new metadata collection. By examining only a subset, time and energy will be saved by focusing only on collecting limited, targeted information.

In some embodiments, while re-running the steps S210-S280, the SOR database 128 utilizes one or more values in the historical sorted lists. For example, while re-running S220, the SOR database 128 uses historical metadata to extract one or more features in the plurality of features.

In some embodiments, when re-running S210 the scope of the metadata to be collected is refined. In an embodiment, refining the scope includes modifying the breadth of metadata to be collected, such as collecting more types of metadata, collect metadata from one or more new technologies, collect metadata from one or more new tenants, a combination thereof and the like.

In an embodiment, refining the scope includes modifying the depth of metadata to be collected, such as collecting more metadata of a certain technology, allocating more memory for storing certain values of metadata or altering a scale/precision of one or more metadata in the plurality of metadata, a combination thereof and the like.

In some embodiments, while re-running S210-S280, modifications are based on the triggered event. In an embodiment, when the triggering is response to user request, the user also requests a modification to the scope of the metadata to be collected. In another embodiment, the scope of the metadata to be collected is modified based on the discovery of a new incident report that included one or more technologies in the plurality of technologies included in the new incident report.

It is generally understood that while re-running steps S210-S280, that the number of features in the plurality of features, the value of each feature in the plurality features, the assigned weight to each feature in the plurality features, the composite risk score and sorted list will be reevaluated and/or recalculated. That each redetermined sorted listed of technologies are stored in the central repository. For example, a refined composite score is calculated for one or more technologies in the plurality of technologies based on one or more refined features extracted from the refined metadata with refined weights (a combination thereof and the like).

In some embodiments, while re-running S270, the SOR database 128 is updated with the refined list of sorted technologies. In an embodiment, the SOR database 128 is updated based on the determined prevalence values. In certain embodiments, each unique technology previously detected is recorded in the database along with metadata describing its frequency across environments, contextual details, a computed prevalence score, a combination thereof, and the like.

Figure 3:
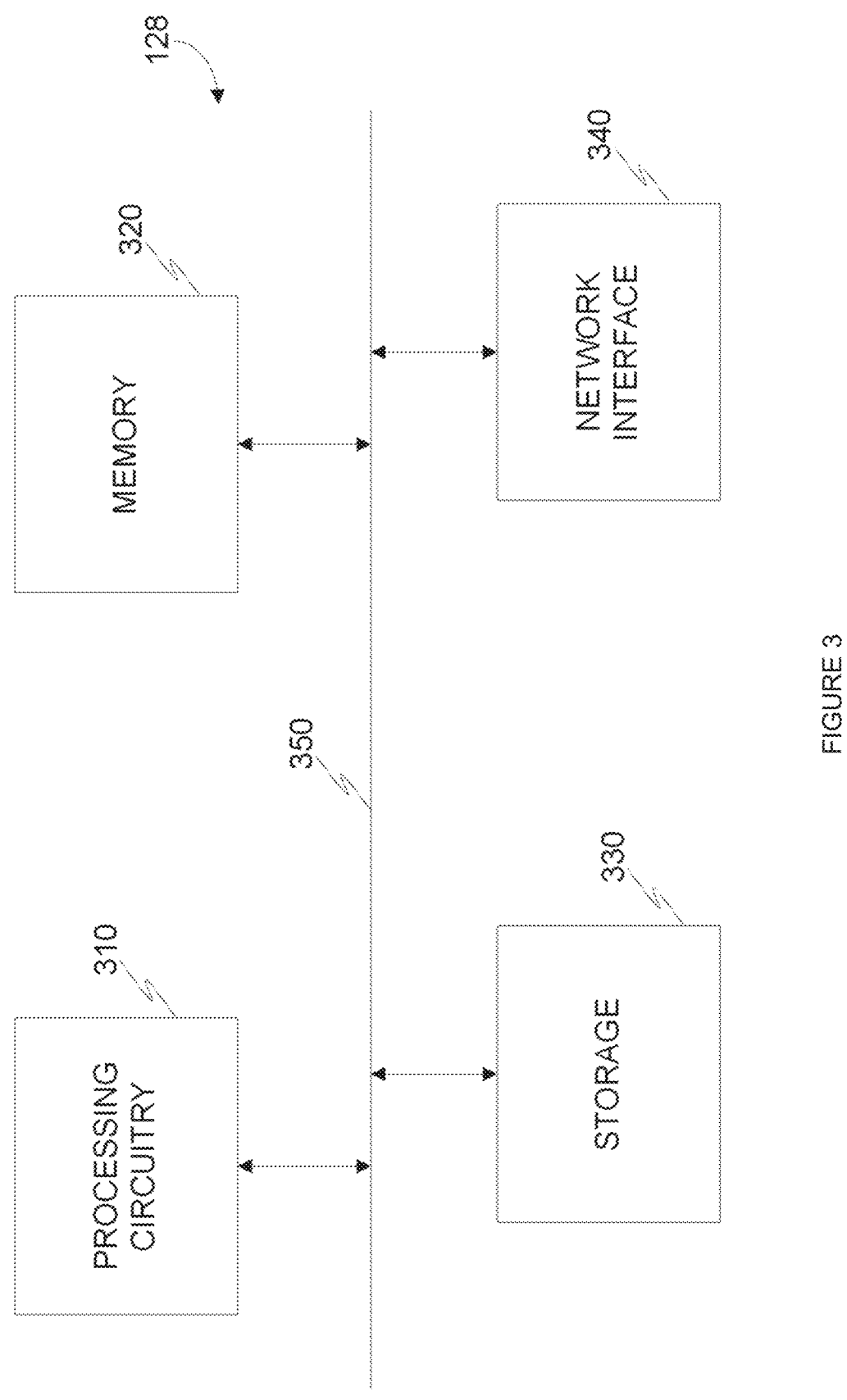
FIG. 3 is an example schematic diagram of an SOR database according to an embodiment.

FIG. 3 is an example schematic diagram of a SOR database 128 according to an embodiment. The SOR database 128 includes, according to an embodiment, a processing circuitry 310 coupled to a memory 320, a storage 330, and a network interface 340. In an embodiment, the components of the SOR database 128 are communicatively connected via a bus 350.

In certain embodiments, the processing circuitry 310 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 320 is a volatile memory (e.g., random access memory, etc.), a non-volatile memory (e.g., read-only memory, flash memory, etc.), a combination thereof, and the like. In some embodiments, the memory 320 is an on-chip memory, an off-chip memory, a combination thereof, and the like. In certain embodiments, the memory 320 is a scratch-pad memory for the processing circuitry 310.

In one configuration, software for implementing one or more embodiments disclosed herein is stored in the storage 330, in the memory 320, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 310, cause the processing circuitry 310 to perform the various processes described herein, in accordance with an embodiment.

In some embodiments, the storage 330 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 340 is configured to provide the SOR database 128 with communication with, for example, the inspection environment 120, the computing environment 110, and the like, according to an embodiment.

It should be understood that the embodiments described herein are not limited to the specific architecture illustrated in FIG. 3, and other architectures may be equally used without departing from the scope of the disclosed embodiments.

Furthermore, in certain embodiments the inspector 122, the inspection controller 124, the security database 126, the SOR database 128, a combination thereof, and the like, may be implemented with the architecture illustrated in FIG. 3. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C;

3A; A and B in combination; B and C in combination; A and C in combination; A, B, and C in combination; 2A and C in combination; A, 3B, and 2C in combination; and the like.

What is claimed is:

1. A method for evaluating levels of risk utilizing a multi-tenant database to detect technologies, comprising:

collecting a plurality of metadata for each technology in a plurality of technologies from a plurality of computing environments from a plurality of tenants;

extracting a plurality of features from the metadata for each technology in the plurality of technologies;

assigning a weight to each feature in the plurality of features for each technology in the plurality of technologies;

determining a plurality of composite risk scores based on the plurality of weighted features for each technology in the plurality of technologies;

triggering an event, and in response to the triggered event:

refining an at least one scope of an at least one metadata in the plurality of metadata of the plurality of technologies from the plurality of computing environments from the plurality of tenants;

collecting a plurality of refined metadata of the plurality of technologies from the plurality of computing environments from the plurality of tenants;

extracting a plurality of refined features based on the plurality of refined metadata;

assigning a refined weight to each refined feature in the plurality of refined features;

determining a plurality of refined composite risk scores based on the plurality of weighted refined features for each technology in the plurality of technologies;

sorting each technology in the plurality of technologies based on the plurality of refined composite risk scores;

generating a refined list of sorted technologies; and storing the refined list of sorted technologies in a central repository; and initiating a mitigatory action for at least one technology in the plurality of technologies from the plurality of computing environments from the plurality of tenants based on the composite risk scores.

2. The method of claim 1, further comprising:

collecting the plurality of metadata of the plurality of technologies from the plurality of computing environments from the plurality of tenants to include, in part, a plurality of incident history reports, where the plurality of incident history reports includes at least one Common Vulnerabilities and Exposures (CVE) report.

3. The method of claim 1, further comprising, collecting the plurality of metadata of the plurality of technologies from the plurality of computing environments from the plurality of tenants to include, in part, a plurality of software files that are installed or deployed on a resource from each technology in the plurality of technologies, where the resource is deployed on a cloud computing environment.

4. The method of claim 1, further comprising:

extracting the plurality of features to include at least one of a prevalence score, a vulnerability score, an incident score or a privilege score.

5. The method of claim 1, further comprising:

determining a composite risk score based on a weighted sum of the plurality of weighted features for each technology in the plurality of technologies.

6. The method of claim 1, further comprising:

sorting each technology in the plurality of technologies based on the plurality of composite risk scores;

generating a list of sorted technologies; and storing the list of sorted technologies in a central repository.

7. The method of claim 6, further comprising:

initiating the mitigatory action for at least one technology in the plurality of technologies from the plurality of computing environments from the plurality of tenants based on the list of sorted technologies.

8. The method of claim 7, further comprising:

initiating the mitigatory action to include at least one of: modifying resource allocation for monitoring the at least one technology in the plurality of technologies, modifying privileges associated with the at least one technology in the plurality of technologies or requiring additional factors of authentication for the at least one technology in the plurality of technologies.

9. The method of claim 1, wherein the event is based on a response to a detection of one or more technologies not in the plurality of technologies, one or more computing environments for one or more tenants different from the plurality of computing environments or one or more tenants different from the plurality of tenants.

10. The method of claim 1, wherein the event is based on a trend analysis of the stored lists of sorted technologies.

11. The method of claim 1, further comprising:

refining the scope of at least one metadata in the plurality of metadata to include at least one of adding a new technology to the plurality of technologies, adding a new computing environment to the plurality of computing environments or adding a new tenant to the plurality of tenants.

12. The method of claim 1, further comprising:

refining the scope of at least one metadata in the plurality of metadata to include at least one of adjusting resource allocation to collect the at least one metadata in the plurality of metadata or adjusting a scale of at least one metadata in the plurality of metadata or adjusting a precision of at least one metadata in the plurality of metadata.

13. A non-transitory computer-readable medium storing a set of instructions for evaluating levels of risk utilizing a multi-tenant database to detect technologies, the set of instructions comprising:

one or more instructions that, when executed by one or more processing circuitries of a device, cause the device to:

collect a plurality of metadata for each technology in a plurality of technologies from a plurality of computing environments from a plurality of tenants;

extract a plurality of features from the metadata for each technology in the plurality of technologies;

assign a weight to each feature in the plurality of features for each technology in the plurality of technologies;

determine a plurality of composite risk scores based on the plurality of weighted features for each technology in the plurality of technologies;

trigger an event, and in response to the triggered event:

refine an at least one scope of an at least one metadata in the plurality of metadata of the plurality of technologies from the plurality of computing environments from the plurality of tenants;

collect a plurality of refined metadata of the plurality of technologies from the plurality of computing environments from the plurality of tenants;

extract a plurality of refined features based on the plurality of refined metadata;

assign a refined weight to each refined feature in the plurality of refined features;

determine a plurality of refined composite risk scores based on the plurality of weighted refined features for each technology in the plurality of technologies;

sort each technology in the plurality of technologies based on the plurality of refined composite risk scores;

generate a refined list of sorted technologies; and store the refined list of sorted technologies in a central repository; and initiate a mitigatory action for at least one technology in the plurality of technologies from the plurality of computing environments from the plurality of tenants based on the composite risk scores.

14. A system for evaluating levels of risk utilizing a multi-tenant database to detect technologies comprising:

a processing circuitry;

a memory, the memory containing instructions that, when executed by the processing circuitry, configure the system to:

collect a plurality of metadata for each technology in a plurality of technologies from a plurality of computing environments from a plurality of tenants;

extract a plurality of features from the metadata for each technology in the plurality of technologies;

assign a weight to each feature in the plurality of features for each technology in the plurality of technologies;

determine a plurality of composite risk scores based on the plurality of weighted features for each technology in the plurality of technologies;

trigger an event, and in response to the triggered event:

refine an at least one scope of an at least one metadata in the plurality of metadata of the plurality of technologies from the plurality of computing environments from the plurality of tenants;

collect a plurality of refined metadata of the plurality of technologies from the plurality of computing environments from the plurality of tenants;

extract a plurality of refined features based on the plurality of refined metadata;

assign a refined weight to each refined feature in the plurality of refined features;

determine a plurality of refined composite risk scores based on the plurality of weighted refined features for each technology in the plurality of technologies;

sort each technology in the plurality of technologies based on the plurality of refined composite risk scores;

generate a refined list of sorted technologies; and store the refined list of sorted technologies in a central repository; and initiate a mitigatory action for at least one technology in the plurality of technologies from the plurality of computing environments from the plurality of tenants based on the composite risk scores.

15. The system of claim 14, wherein the memory contains further instructions which when executed by the processing circuitry further configure the system to:

collect the plurality of metadata of the plurality of technologies from the plurality of computing environments from the plurality of tenants to include, in part, a plurality of incident history reports, where the plurality of incident history reports includes at least one Common Vulnerabilities and Exposures (CVE) report.

16. The system of claim 14, wherein the memory contains further instructions which when executed by the processing circuitry further configure the system to:

collect the plurality of metadata of the plurality of technologies from the plurality of computing environments from the plurality of tenants to include, in part, a plurality of software files that are installed or deployed on a resource from each technology in the plurality of technologies, where the resource is deployed on a cloud computing environment.

17. The system of claim 14, wherein the memory contains further instructions which when executed by the processing circuitry further configure the system to:

extract the plurality of features to include at least one of a prevalence score, a vulnerability score, an incident score or a privilege score.

18. The system of claim 14, wherein the memory contains further instructions which when executed by the processing circuitry further configure the system to:

determine a composite risk score based on a weighted sum of the plurality of weighted features for each technology in the plurality of technologies.

19. The system of claim 14, wherein the memory contains further instructions which, when executed by the processing circuitry, further configure the system to:

sort each technology in the plurality of technologies based on the plurality of composite risk scores;

generate a list of sorted technologies; and store the list of sorted technologies in a central repository.

20. The system of claim 19, wherein the memory contains further instructions which, when executed by the processing circuitry, further configure the system to:

initiate the mitigatory action for at least one technology in the plurality of technologies from the plurality of computing environments from the plurality of tenants based on the list of sorted technologies.

21. The system of claim 20, wherein the memory contains further instructions which, when executed by the processing circuitry, further configure the system to:

initiate the mitigatory action to include at least one of:

modify resource allocation for monitoring the at least one technology in the plurality of technologies, modifying privileges associated with the at least one technology in the plurality of technologies or requiring additional factors of authentication for the at least one technology in the plurality of technologies.

22. The system of claim 14, wherein event is based on a response to a detection of one or more technologies not in the plurality of technologies, one or more computing environments for one or more tenants different from the plurality of computing environments or one or more tenants different from the plurality of tenants.

23. The system of claim 14, wherein the event is based on a trend analysis of the stored lists of sorted technologies.

24. The system of claim 14, wherein the memory contains further instructions which when executed by the processing circuitry further configure the system to:

refine the scope of at least one metadata in the plurality of metadata to include at least one of adding a new technology to the plurality of technologies, adding a new computing environment to the plurality of computing environments or adding a new tenant to the plurality of tenants.

25. The system of claim 14, wherein the memory contains further instructions which when executed by the processing circuitry further configure the system to:

refine the scope of at least one metadata in the plurality of metadata to include at least one of adjusting resource allocation to collect the at least one metadata in the plurality of metadata or adjusting a scale of at least one metadata in the plurality of metadata or adjusting a precision of at least one metadata in the plurality of metadata.

* * * * *